US009091567B2

(12) United States Patent
Beutler et al.

(10) Patent No.: US 9,091,567 B2
(45) Date of Patent: Jul. 28, 2015

(54) MEASURING BODY DEVICE FOR A POSITION/PATH MEASUREMENT SYSTEM, POSITION/PATH MEASUREMENT SYSTEM AND APPLICATION ON WHICH A POSITION/PATH MEASUREMENT SYSTEM IS INSTALLED

(71) Applicant: BALLUF GmbH, Neuhausen (DE)

(72) Inventors: Torsten Beutler, Ostfildern (DE); Roland Holder, Dettingen/Teck (DE)

(73) Assignee: BALLUFF GmbH, Neuhausen (DE)

( * ) Notice: Subject to any disclaimer, the term of this patent is extended or adjusted under 35 U.S.C. 154(b) by 345 days.

(21) Appl. No.: 13/681,486

(22) Filed: Nov. 20, 2012

(65) Prior Publication Data

US 2013/0111776 A1    May 9, 2013

Related U.S. Application Data

(63) Continuation of application No. PCT/EP2011/056905, filed on May 2, 2011.

(30) Foreign Application Priority Data

May 21, 2010    (DE) ...................... 20 2010 007 285 U

(51) Int. Cl.
*G01D 5/347*    (2006.01)

(52) U.S. Cl.
CPC .................................. *G01D 5/34707* (2013.01)

(58) Field of Classification Search
CPC ................................................ G01D 5/34707
USPC ......... 33/1 PT, 706, 708; 324/207.22, 207.25
See application file for complete search history.

(56) References Cited

U.S. PATENT DOCUMENTS 4,359,657 A * 11/1982 Matsumoto et al. ..... 310/156.26
4,366,937 A *  1/1983 Heard ......................... 248/230.8

(Continued)

FOREIGN PATENT DOCUMENTS

DE    196 11 983    7/1997
DE    198 02 036    7/1999

(Continued)

OTHER PUBLICATIONS

"Lineare Weg-und Abstandssensoren" (Linear Displacement and Distance Sensors), Thomas Burkhardt, Albert Feinäugle, Sorin Fericean, Alexander Forkl, Verlag moderne Industrie, Die Bibliothek der Technik, vol. 271, Munich 2004, chapter "Wegsensoren mit magnetisch kodiertem Maßkörper", pp. 67-76.

*Primary Examiner* — Christopher Fulton
(74) *Attorney, Agent, or Firm* — Lipsitz & McAllister, LLC

(57) ABSTRACT

A measuring body device is provided for a position/path measurement system, having at least one fixing band, with a first and a second end, to fix the measuring body device to an application. A measuring body in the form of a band is provided with at least one coding layer associated with the fixing band. At least one connecting mechanism fixes the first and second ends of the fixing band relative to one another. The connecting mechanism is a bridge element, fixed or fixable relative to the ends of the fixing band. At least one path storage device is arranged on the bridge element with a first transverse element, a second transverse element, spaced apart from the first transverse element, and a web element which connects the first and second transverse elements and which is integrally connected thereto. A spacing between the first and second transverse elements is determinably adjustable.

44 Claims, 10 Drawing Sheets

(56) References Cited

U.S. PATENT DOCUMENTS

| | | | |
|---|---|---|---|
| 5,208,949 A * | 5/1993 | Calmettes et al. | 24/20 R |
| 5,904,442 A * | 5/1999 | Takeda | 403/392 |
| 5,979,238 A | 11/1999 | Boege et al. | |
| 6,051,971 A * | 4/2000 | Holden | 324/207.24 |
| 6,098,295 A * | 8/2000 | Feichtinger | 33/1 PT |
| 6,178,656 B1 | 1/2001 | Jung | |
| 6,523,268 B1 | 2/2003 | Böge | |
| 6,550,150 B1 * | 4/2003 | Shirai et al. | 33/290 |
| 6,612,048 B2 * | 9/2003 | Peterlechner et al. | 33/755 |
| 8,547,088 B2 * | 10/2013 | Bauch et al. | 324/207.22 |
| 2010/0219811 A1 | 9/2010 | Bauch et al. | |
| 2011/0001471 A1 * | 1/2011 | Hala et al. | 324/207.25 |
| 2012/0124849 A1 * | 5/2012 | Hiller et al. | 33/1 PT |

FOREIGN PATENT DOCUMENTS

| | | |
|---|---|---|
| DE | 199 56 833 | 5/2001 |
| DE | 20 2009 003 253 | 8/2010 |
| DE | 20 2009 017 132 | 6/2011 |

* cited by examiner

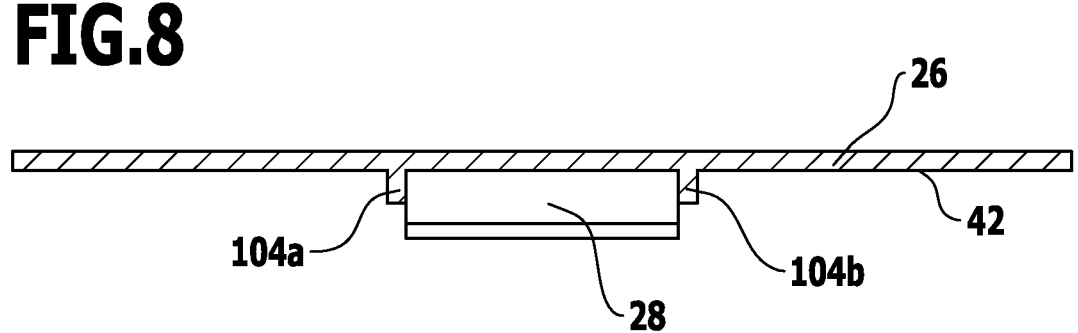
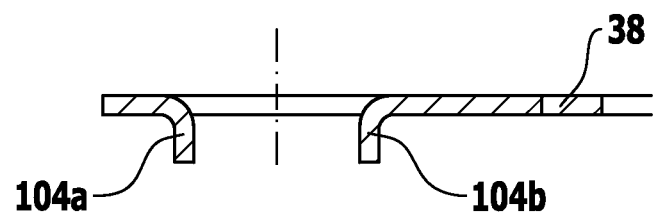
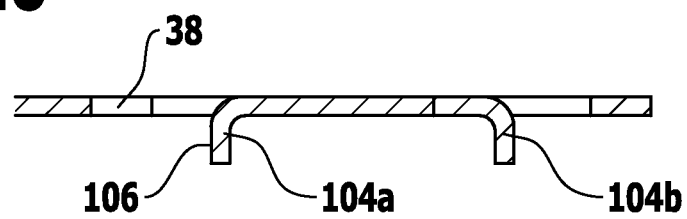

MEASURING BODY DEVICE FOR A POSITION/PATH MEASUREMENT SYSTEM, POSITION/PATH MEASUREMENT SYSTEM AND APPLICATION ON WHICH A POSITION/PATH MEASUREMENT SYSTEM IS INSTALLED

This application is a continuation of international application number PCT/EP2011/056905 filed on May 2, 2011 and claims the benefit of German application number 20 2010 007 285.9 filed on May 21, 2010, which are incorporated herein by reference in their entirety and for all purposes.

BACKGROUND OF THE INVENTION

The invention relates to a measuring body device for a position/path measurement system, comprising at least one fixing band to fix the measuring body device to an application, wherein the at least one fixing band has a first end and a second end, a measuring body in the form of a band with at least one coding layer made of coding material, which is associated with the least one fixing band, and at least one connecting mechanism, which fixes the first end and the second end of the fixing band relative to one another.

The invention also relates to a position/path measurement system, comprising a measuring body device.

Furthermore the invention relates to an application, on which a position/path measurement system is positioned.

Magnetically coded measuring bodies and position/path measurement systems, which have such magnetically coded measuring bodies, are described, for example, in the chapter "Wegsensoren mit magnetisch kodiertem Maßkörper" (Path sensors with a magnetically coded measuring body) in the publication "Lineare Weg- and Abstandssensoren" (Linear path and distance sensors) by Thomas Burkhardt, Albert Feinäugle, Sorin Fericean and Alexander Forkl, Verlag Moderne Industrie, Munich 2004. Corresponding measuring systems have a sensor head, which receives magnetic field sensors and preferably the complete electronics, and a magnetically coded measuring body. The measuring body comprises alternating magnetic north poles and south poles. The magnetic field lines of the magnetically coded measuring body form a three-dimensional vector field. The sensor head moves above the measuring body. Magnetic field sensors, which either measure the component of the magnetic field vector in the direction of its sensitivity or the angle of the magnetic vector field with respect to the movement direction, are located, for example, in the sensor head. The counting of magnetic periods allows a statement about the path covered.

In the German utility model, not prior published, No. 20 2009 003 253.1 of 27 Feb. 2009 and in the US patent application, not prior published, Ser. No. 12/470,796 of 22 May 2009 (now U.S. Pat. No. 8,547,088), a coded measuring body for a position/path measurement system is described and comprises a carrier band, at least one coding layer made of coding material, which is arranged on the carrier band, and a covering band, which covers the coding material toward an external space, the covering band being formed by the carrier band. A connecting mechanism is provided, which connects a first region of the measuring body and a second region of the measuring body to one another.

A measuring body device for a position/path measurement system is described in the German utility model, not prior published, No. 20 2009 017 132.9 of 11 Dec. 2009 of the same Applicant, which comprises a fixing band for fixing the measuring body device on an application, the fixing band having a first end and a second end, a measuring body in the form of a band with at least one coding layer made of coding material, which is associated with the fixing band, and at least one connecting mechanism, which fixes the first end and the second end of the fixing band relative to one another. The fixing band, at least in the region of the first end and the second end, has recesses. The at least one connecting mechanism has a first hook element for hooking into one or more recesses on the first end of the fixing band and a second hook element for hooking on the second end of the fixing band. The at least one connecting mechanism comprises one or more connecting elements, which is connected to the first hook element and the second hook element and fixes them relative to one another.

In accordance with the present invention, a measuring body device is provided, which is constructed in a simple manner and with which fixing to an application can be achieved in a simple manner.

SUMMARY OF THE INVENTION

In accordance with an embodiment of the invention, in the measuring body device the at least one connecting mechanism comprises a bridge element, which is fixed or fixable relative to the first end of the at least one fixing band and relative to the second end of the at least one fixing band, and at least one path storage device is arranged on the bridge element, with a first transverse element, a second transverse element spaced apart from the first transverse element and a web element, which connects the first transverse element and the second transverse element and is integrally connected to the first transverse element and the second transverse element, a spacing between the first transverse element and the second transverse element being determinably adjustable.

The path storage device is formed by means of the first transverse element, the second transverse element and the web element as a type of turning outwards at the bridge element. By plastic deformation at this turning out, the spacing between the first transverse element and the second transverse element can be determinably reduced. As a result, a tensioning force can be exerted on the at least one fixing band, if the bridge element is correspondingly fixed thereto. As a result, the measuring body device can in turn be fixed on the application by tensioning.

A corresponding connecting mechanism can be realised in a simple manner. Furthermore, the bracing on an application can be realised in a simple manner by means of a corresponding tool, such as pliers.

The number of components, which are required to fix the measuring body device to an application, can be minimised. Basically, a corresponding connecting mechanism can be formed integrally with the bridge element and the path storage device.

It is favourable if the bridge element comprises a first region, which is fixed or fixable, relative to the first end of the at least one fixing band and on which the first transverse element is integrally seated. As a result, the connecting mechanism can be realised in a simple manner.

The first transverse element is advantageously oriented transverse to the first region. It is thus basically possible for the first transverse element (before the tensioning) to be oriented at least approximately perpendicular to the first region. It is advantageous if the first transverse element is oriented at an acute angle of less than 90° to the first region. As a result, when exerting a compressive force for tensioning, a force can also be achieved in the direction toward the application to bring about an abutment on the application.

For the same reason, it is favourable if the bridge element comprises a second region, which is fixed or fixable relative to the second end of the at least one fixing band, and on which the second transverse element is integrally seated.

It is then accordingly advantageous if the second transverse element is oriented transverse to the second region. In particular, the second transverse element (before the tensioning) is oriented at an acute angle, which is less than 90°, with respect to the second region.

The web element is advantageously oriented transverse to the first transverse element and transverse to the second transverse element. The web element ensures the connection between the first transverse element and the second transverse element. It can furthermore be advantageously plastically deformed, in order to realise a "path storage".

In one embodiment, the web element has at least one recess. The at least one recess may be continuous or, for example, be configured as a discontinuous indentation (depression). A plastic deformation for path shortening can thus be achieved in a simple manner.

In particular, the spacing between the first transverse element and the second transverse element can be determinably adjusted by plastic deformation of the web element and/or the first transverse element and/or the second transverse element. A path storage device can thus be realised in a simple manner and the bridge element with the path storage device can be integrally formed, for example.

It is quite particularly advantageous if the first transverse element and the second transverse element have engagement faces for a tool to shorten the spacing between the first transverse element and the second transverse element. By engaging the tool, for example pliers, a compressive force can be exerted, by means of which the spacing between the first transverse element and the second transverse element is determinably shortened. As a result, a tensioning force can be exerted on corresponding end regions of the fixing band and the latter can then be kept tensioned on the application. As a result, the measuring body device is in turn fixed.

In an advantageous embodiment, one or more recesses and/or one or more hooks are arranged on the at least one fixing band in the region of the first end and/or the second end. As a result, a previously loose connecting mechanism can be fixed in a simple manner to the first end of the fixing band and/or relative to the second end of the fixing band. If, accordingly, one or more hooks are arranged on the connecting mechanism or one or more hooks are arranged on the at least one fixing band, a hook connection can be produced by a hook engagement in a recess. A connection sufficient for bracing can thus be produced.

In particular, one or more hooks are arranged on the bridge element for engagement in one or more recesses, which are positioned on at least one fixing band and/or one or more recesses are arranged on the bridge element for the engagement of one or more hooks of the at least one fixing band. It is thus possible to place an unclosed fixing band around the application. By inserting the hook(s) on the recess(es), the band can be closed. The at least one fixing band, and therefore the measuring body device, can then be tensioned on the application by means of an operation on the path storage device.

In one embodiment, at least one hook or at least one recess is arranged on the bridge element toward one end of the at least one fixing band. This allows a hooking in connection in the region of a (single) end of the at least one fixing band to be achieved.

The bridge element is then rigidly connected to the at least one fixing band relative to one end, for example by welding or screwing, and the hook(s) are provided for fixing relative to the other end. A corresponding fixing of the measuring body device can then be achieved in a simple manner. The connecting mechanism is already fixedly installed with respect to one end of the fixing band. A hooking in and subsequently a path shortening on the path storage device for tensioning takes place at the other end of the fixing band.

In an alternative embodiment, at least one hook and/or at least one recess is provided, in each case, on the bridge element toward both ends of the at least one fixing band. As a result, the connecting mechanism can be hooked in on the fixing band toward both ends.

In one embodiment, the at least one recess and/or the at least one hook, which is arranged on the fixing band, is positioned on a web element (tongue element), which is connected to the at least one fixing band. Basically, the corresponding web element may be integrally formed with the at least one fixing band. It is also possible that the web element was retrospectively connected, for example by screwing or welding, to the at least one fixing element. A corresponding fixing band can be produced in a simple manner, namely as an "undisturbed" band. The corresponding parts of the connecting mechanism (namely the web element(s) and the bridge element(s)) are then retrospectively fixed to the at least one fixing band; the bridge element(s) are connected to the band and the web element(s) are connected to the band.

It is, in particular, provided here that that element, which is provided with the hook(s), is connected to the band in such a way that it projects beyond the corresponding end of the band. This element can then overlap a region of the band at the other end and that part with the recess(es) can then abut the part with the hook(s).

In a structurally simple embodiment, a hook is formed by a stamped tab. As a result, a hook can be realised in a simple manner on a connecting device.

It is quite particularly advantageous if, in the region of a hook connection, an element with the at least one recess abuts an element with the at least one hook and a hook engages from below in an associated recess. A good abutment of the fixing band outside the connecting mechanism and of the connecting mechanism on the application can thus be achieved. This improves the fixing. For example, the element with the hook(s) is the bridge element and a web element, which is arranged on the fixing band, then abuts the bridge element. It is also possible for, for example, one web element, which is arranged on the at least one fixing band, to be provided with one or more hooks and for the element, which abuts thereon, to then be a part of the bridge element.

Advantageously, when at least one fixing band is fixed on the application, a hook abuts an end face of the associated recess and faces the path storage device. As a result, the fixing band can be pulled in the direction of the path storage device and thereby tensioned during path shortenings of the path storage device, brought about by means of the hook(s).

It is favourable if the at least one recess on the at least one fixing band is a through hole. A hook can thus be hooked in a simple manner and engage through the recess. A hook can then also partly abut an upper side of a region, on which a recess is formed. As a result, an axial securing against unhooking is achieved.

It is favourable if a plurality of recesses are provided in that they are uniformly spaced apart. This allows a secure hook fixing to be achieved.

In particular, a spacing of adjacent recesses in the longitudinal direction of the at least one fixing band corresponds to one coding period or an integral multiple thereof. As a result, a sensor head can easily travel over the measuring body device through 360°.

It is favourable if a first row of recesses and a second row of recesses are provided, the measuring body being positioned between the first row and the second row. As a result, to a certain extent, a channel is predefined between the first row and the second row, in which the measuring body device and a sensor head are movable relative to one another. This allows the measuring body device to be traveled over through 360°.

In one embodiment, tabs for positioning and/or fixing the measuring body are integrally formed on the at least one fixing band. This allows the measuring body to be secured with respect to the fixing band in a simple, secure manner.

It is favourable in terms of production, if tabs are produced by stamping.

For example, tabs are arranged on recesses and are at least partially made of material which is removed at the recess. This allows both a recess for hooking in and a tab to be produced in one manufacturing step.

It is quite particularly advantageous if the at least one fixing band is a metal band. This can be machined in a simple manner. For example, recesses can be produced in a simple manner by stamping or the like. Furthermore, the metal band can easily be flexible.

If the at least one fixing band is flexible, it can be adapted in a simple manner to a surface configuration of an application. For example, it can be placed around circular applications, or an adaptation to curves of the application can be achieved.

It is quite particularly advantageous if the measuring body has a first end and a second end, wherein, with relative fixing of the first end and the second end of the at least one fixing band, the measuring body continues over its first end and its second end without coding modification. As a result, the coding in the region of the transition between the first end and the second end is minimally influenced and a sensor head can also travel over the measuring body in the region of the ends of the measuring body. Thus, a measuring range of greater than 360° can be realised, for example.

In an advantageous embodiment, at least two hooks are arranged on the bridge element and/or the at least one fixing band. This allows a secure fixing to be achieved with corresponding engagement in associated recesses.

It is favourable if the hooks are arranged one behind the other in relation to a connecting direction of the first end and the second end of the at least one fixing band. This allows a secure connection between the connecting mechanism and the fixing band to be achieved in the region of the corresponding end.

In one embodiment, a first connecting device is provided, which is associated with a first row of recesses, and a second connecting device is provided, which is associated with a second row of recesses. This allows the connecting mechanisms to be positioned spaced apart with respect to one another in a transverse direction, a secure fixing of the fixing band on the application being achieved. A type of channel, through which a sensor head can be guided, is formed between the first connecting mechanism and the second connecting mechanism.

It is favourable if the bridge element, abutting on an upper side of the at least one fixing band, is connected thereto. This allows a stable and secure connection to be achieved between the bridge elements and at least one fixing band.

In one embodiment, the measuring body has a covering band, which covers the at least one coding layer. The latter is thereby protected.

It may be provided here that the covering band faces the at least one fixing band or faces away from the at least one fixing band.

In an advantageous embodiment, the measuring body is magnetically coded and comprises a magnetic material, as the coding material. By a sequence of north and south poles, a corresponding coding can be achieved in a simple manner.

It is basically also possible for the measuring body to be optically or capacitively coded.

In particular, the fixing band is closed if the first end and the second end of the at least one fixing band are fixed relative to one another. The closed configuration is achieved here by the at least one connecting mechanism, which to a certain extent is a continuation of the fixing band to close the fixing band.

It is basically possible here for the measuring body to be fixed on the at least one fixing band, i.e. the measuring body is connected, adhesively, by an interlocking fit or with a frictional fit, for example, to the fixing band. It is also possible for the measuring body to not be fixedly held on the fixing band, but for the fixing band to clamp the measuring body with the application by a corresponding exertion of force on the measuring body.

According to the invention, a position/path measurement system is provided, which comprises a measuring body device according to the invention, and a sensor mechanism, which has at least one sensor, which is sensitive to the coding.

The relative position of the sensor to the measuring body can be determined.

It is advantageous here if a first sensor and a second sensor are provided. A region of greater than 360° can therefore be detected, for example.

It is advantageous, for example, if the first sensor and the second sensor are located opposite to each other and, in particular, are radially or diametrically opposite.

In particular, the at least one sensor is magnetic field-sensitive and the coded measuring body is magnetically coded.

According to the invention, an application can be provided, on which a position/path measurement system according to the invention is installed, the application comprising a rotatable or pivotable element such as a shaft, on which the at least one fixing band is fixed.

The advantages described in conjunction with the measuring body device according to the invention and the position/path measurement system according to the invention are thus produced.

In particular, the fixing band surrounds the rotatable or pivotable element. The fixing band can also be adapted to curved surfaces.

Advantageously, the fixing band is kept tensioned by the at least one connecting mechanism on a rotatable or pivotable element. An additional fixing is then no longer necessary.

The following description of preferred embodiments is used in conjunction with the drawings for more detailed description of the invention.

BRIEF DESCRIPTION OF THE DRAWINGS

FIG. 8 shows a sectional view of an embodiment of a fixing band with a fixed measuring body;

FIG. 9 shows a sectional view of a further embodiment of a fixing band;

FIG. 10 shows a sectional view of a further embodiment of a fixing band;

DETAILED DESCRIPTION OF THE INVENTION

Figure 1:
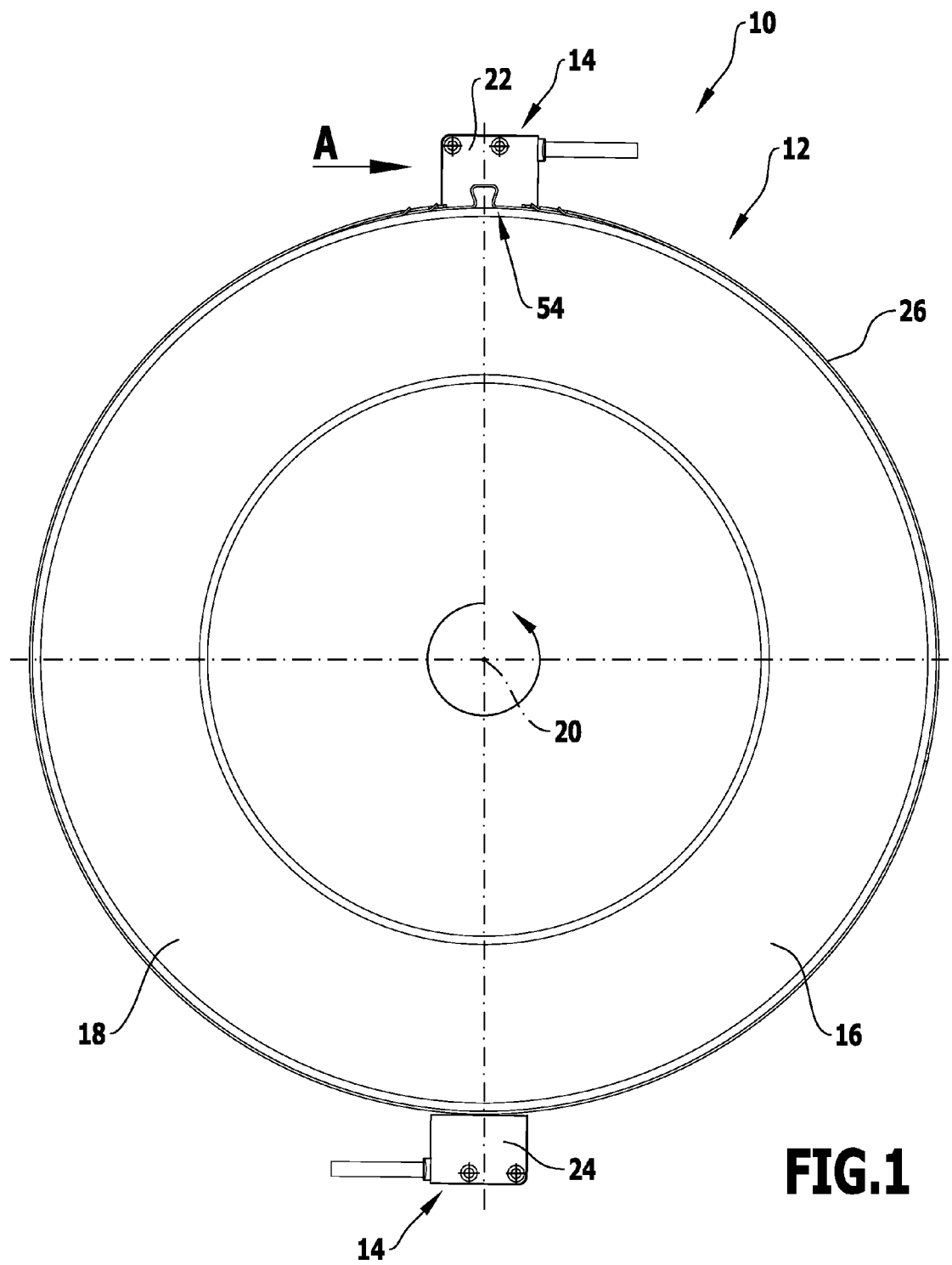
FIG. 1 shows a schematic view of an embodiment of an application, on which an embodiment of a position/path measurement system according to the invention is fixed.

One embodiment of a position/path measurement system according to the invention, which is shown in FIG. 1 and designated 10 there and is shown in part views in FIGS. 1 to 6, comprises a measuring body device 12 and a sensor device 14. The measuring body device 12 is coded with at least one coding layer and the sensor device 14 comprises at least one sensor, which is sensitive to this coding.

In one embodiment, which is shown in FIG. 1, the measuring body device 12 is non-rotatably fixed to an application 16. The application 16 is, for example, a shaft 18. The latter can be rotated about a rotational axis 20. The measuring body device 12 is seated on an external casing of this shaft 18.

The sensor device 14 comprises a first sensor 22 and a second sensor 24. These are positioned diametrically opposite. They are located, in particular, on a line, which passes through the rotational axis 20. The first sensor 22 and the second sensor 24 are, for example, stationarily positioned and the shaft 18 can rotate with respect to these sensors 22 and 24.

The rotational position of the shaft 18 can be determined by the position/path measurement system 10.

The measuring body device 12 comprises a fixing band 26. This fixing band 26 is flexible and in particularly resilient or plastic. It is typically produced from a metallic material. A measuring body 28 (FIG. 5) is arranged on the fixing band 26. Said measuring body comprises at least one coding layer 30 made of coded material.

In one embodiment, the at least one coding layer 30 is produced from a magnetic (magnetisable) material. It comprises magnetic pole fields 32a, 32b (north pole fields and south pole fields), which follow one another alternately. The size and/or sequence of the pole fields determines the coding. The coding in turn determines the field applied to the sensor device 14, which has the at least one magnetic field-sensitive sensor 22, 24 and thus contains the position dependency.

The position of the sensor device 14 relative to the measuring body 12 can be determined in that the corresponding signal of the sensor device 14 is evaluated.

The magnetic field lines of the magnetic pole fields 32a, 32b form a three-dimensional vector field. The sensor device 14 is positioned in this vector field. For example, the shaft 18 with the measuring body device 12 moves relative to the sensor device 14 and the vector field thus moves relative to the sensor device 14. By counting magnetic periods, which are detected by the sensor device 14, information is obtained about the path covered and therefore the rotational position, a direction dependency basically being detectable when there is a corresponding orientation of the sensor device 14. Absolute positions can be determined, for example, by carrying out a reference run.

It is also possible for the position/path measurement system 10 to be realised as an absolute measuring system without a prior reference run. For this purpose, the at least one coding layer 30, apart from at least one incremental track, comprises an absolute track, which can be scanned by corresponding sensors of the sensor device 14.

Position/path measurement system with magnetically coded measuring bodies are, for example, described in the chapter "Wegsensoren mit magnetisch kodiertem Maßkörper" (Path sensors with a magnetically coded measuring body) in the publication "Lineare Weg- and Abstandssensoren" (Linear path and distance sensors) by Thomas Burkhardt, Albert Feinäugle, Sorin Fericean and Alexander Forkl, Verlag moderne Industrie, Munich 2004. Reference is expressly made to this publication and it is therefore made part of this document by reference.

The coding of the measuring body 28 may also, for example, be capacitive or optical, the sensor device 14 then being correspondingly configured.

The coding layer 30 has a period $D_2$ for an incremental track.

The fixing band 26 has a first end 34 and a second end 36.

At least in the region of the second end 36, the fixing band 26 has continuous recesses 38, which extend between an upper side 40 and a lower side 42 of the fixing band 26. These recesses 38 are produced, for example, by a punching operation. Adjacent recesses 38 have a spacing $D_1$.

The spacing $D_1$ is preferably of equal size to the period $D_2$.

Figure 2:
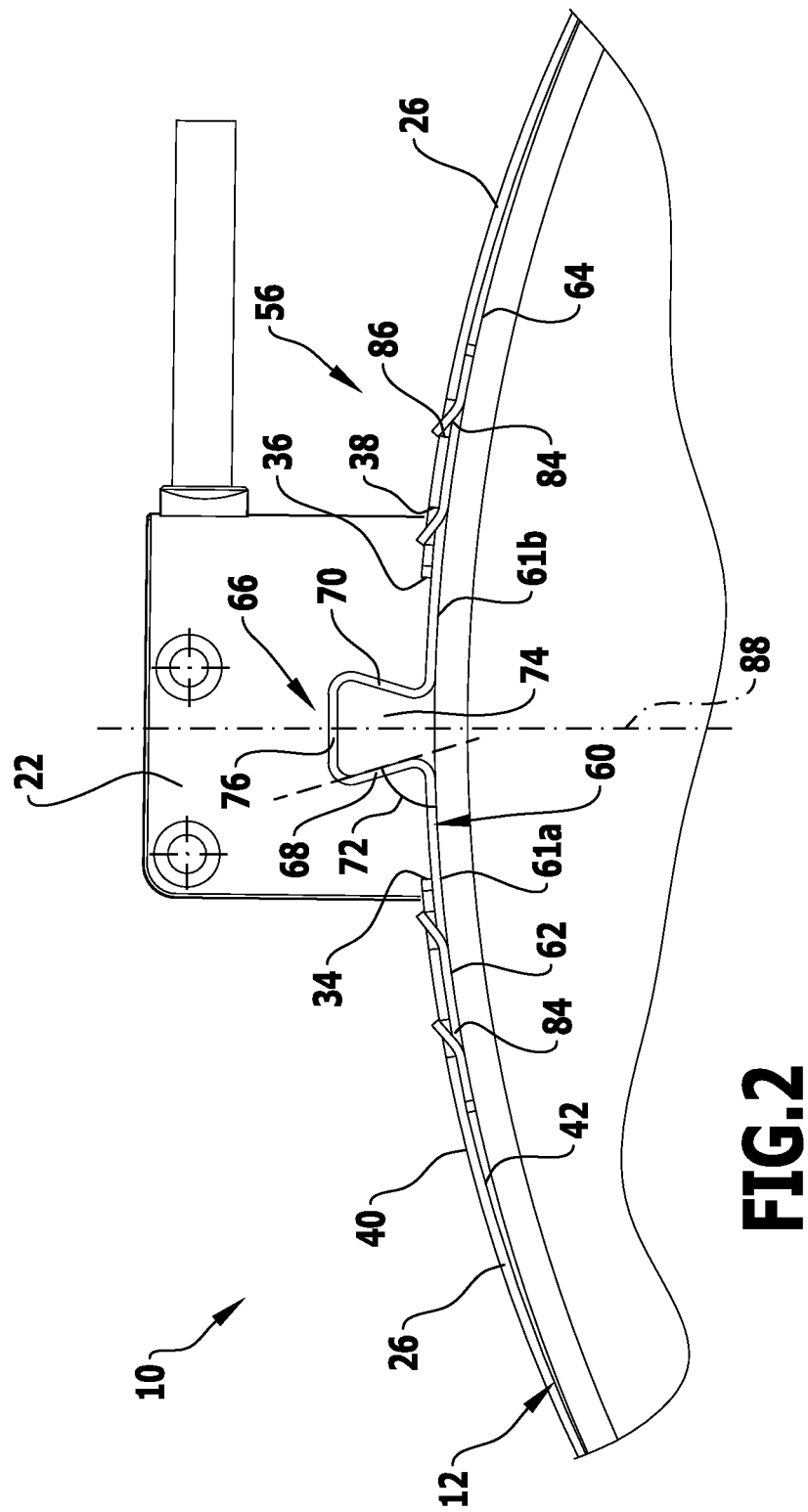
FIG. 2 shows an enlarged view of a detail of the position/path measurement system according to FIG. 1 with a sensor in a sectional view in a first variant.
Figure 4:
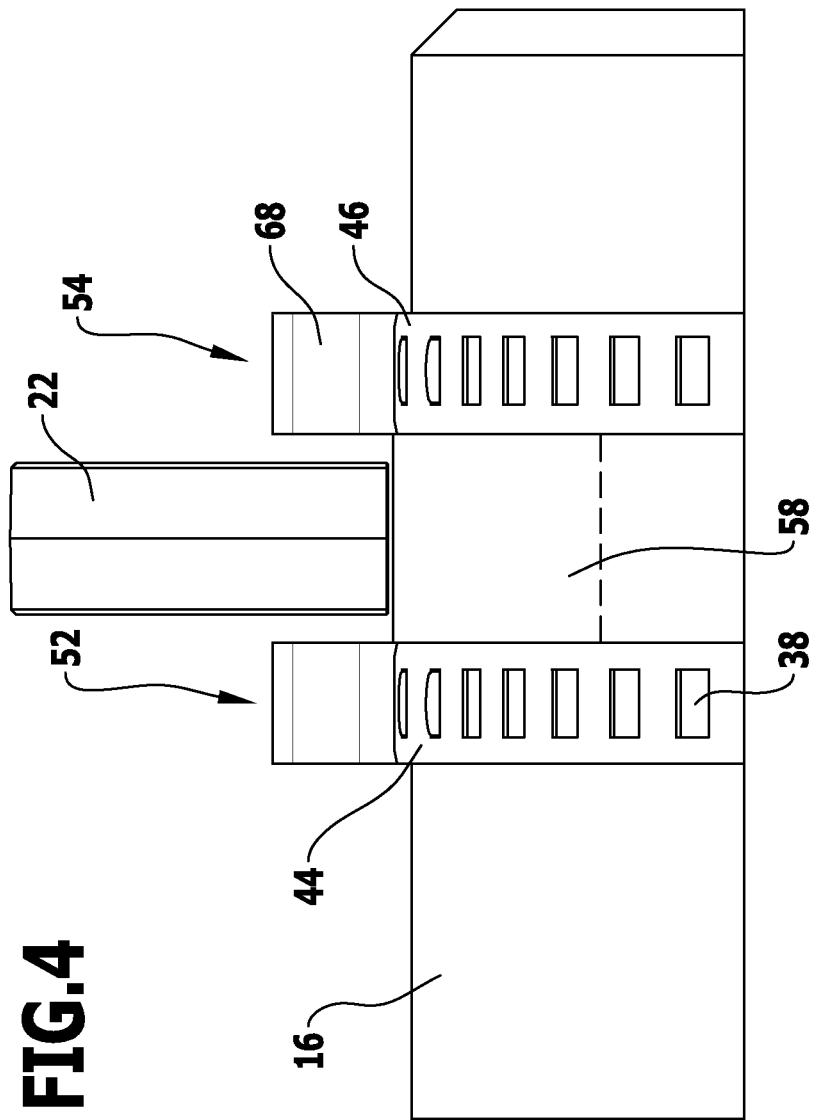
FIG. 4 shows an enlarged view in the direction A according to FIG. 1.
Figure 5:
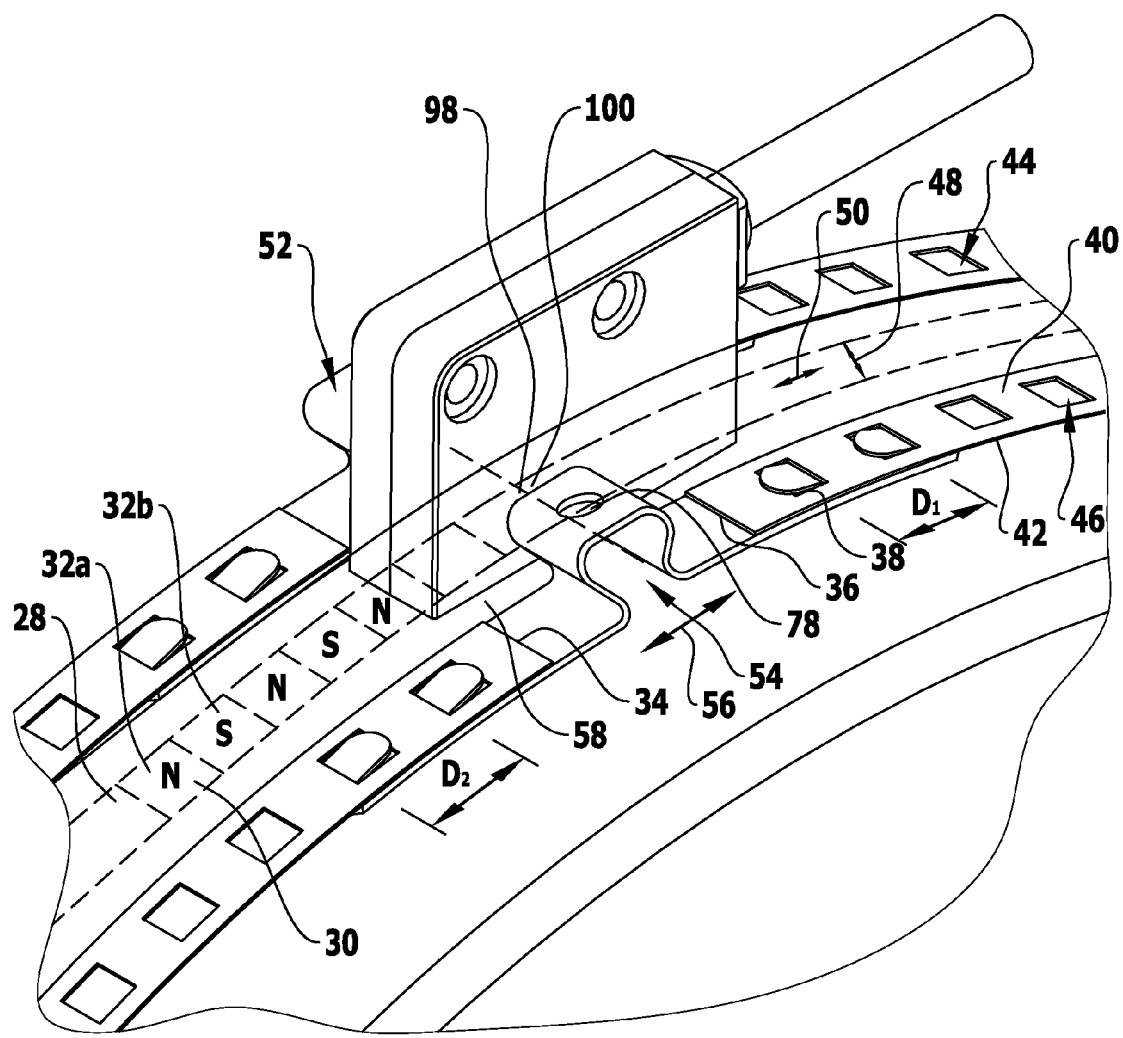
FIG. 5 shows a perspective view of the region, which is shown in FIGS. 2 and 4.
Figure 6:
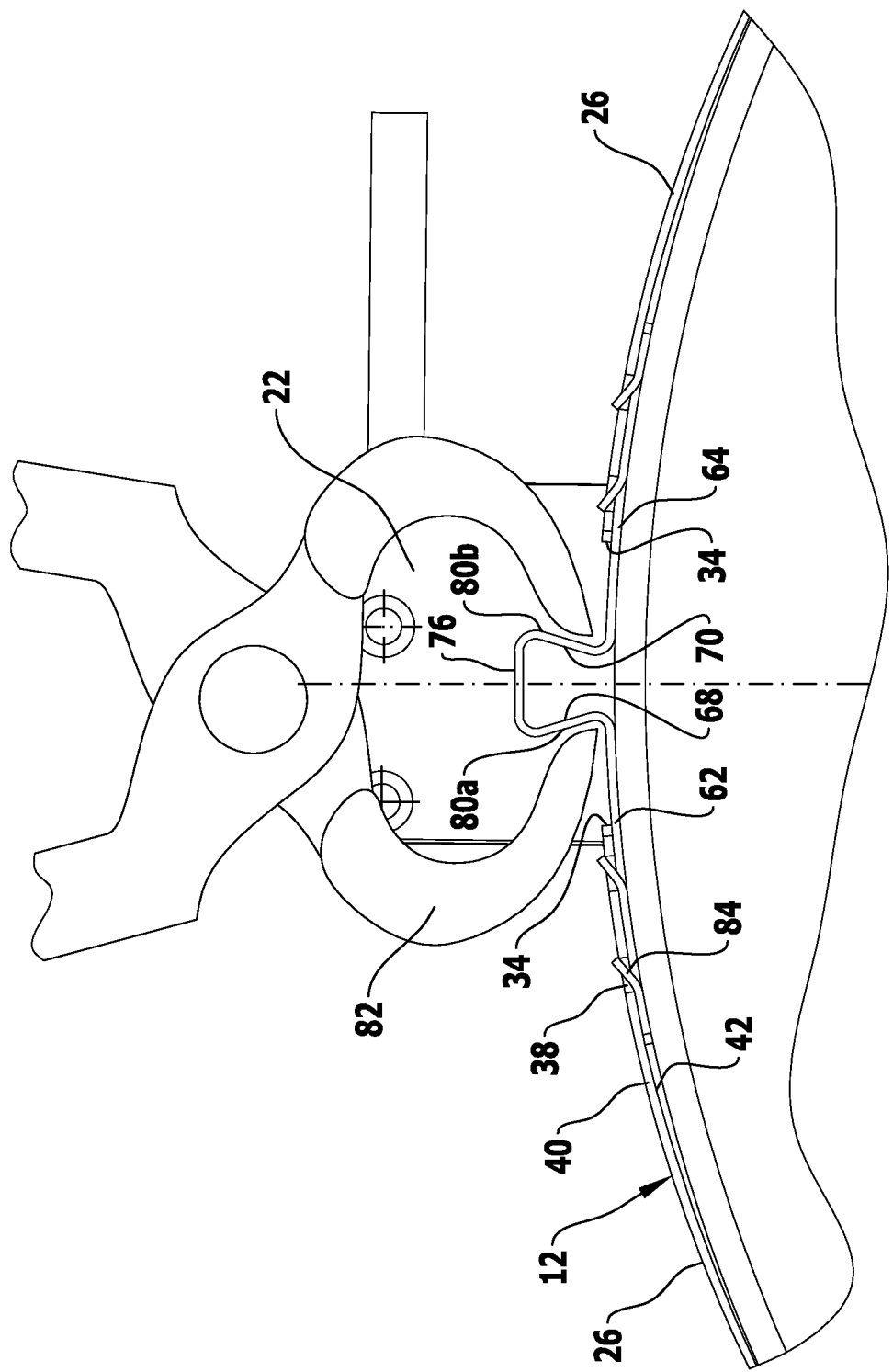
FIG. 6 shows a similar view to FIG. 2, a tool engaging on a path storage device.

In one embodiment, which is shown in FIGS. 2, 4 and 5, recesses 38 are arranged both in the region of the first end 34 and of the second end 36 of the fixing bands 28.

Figure 3:
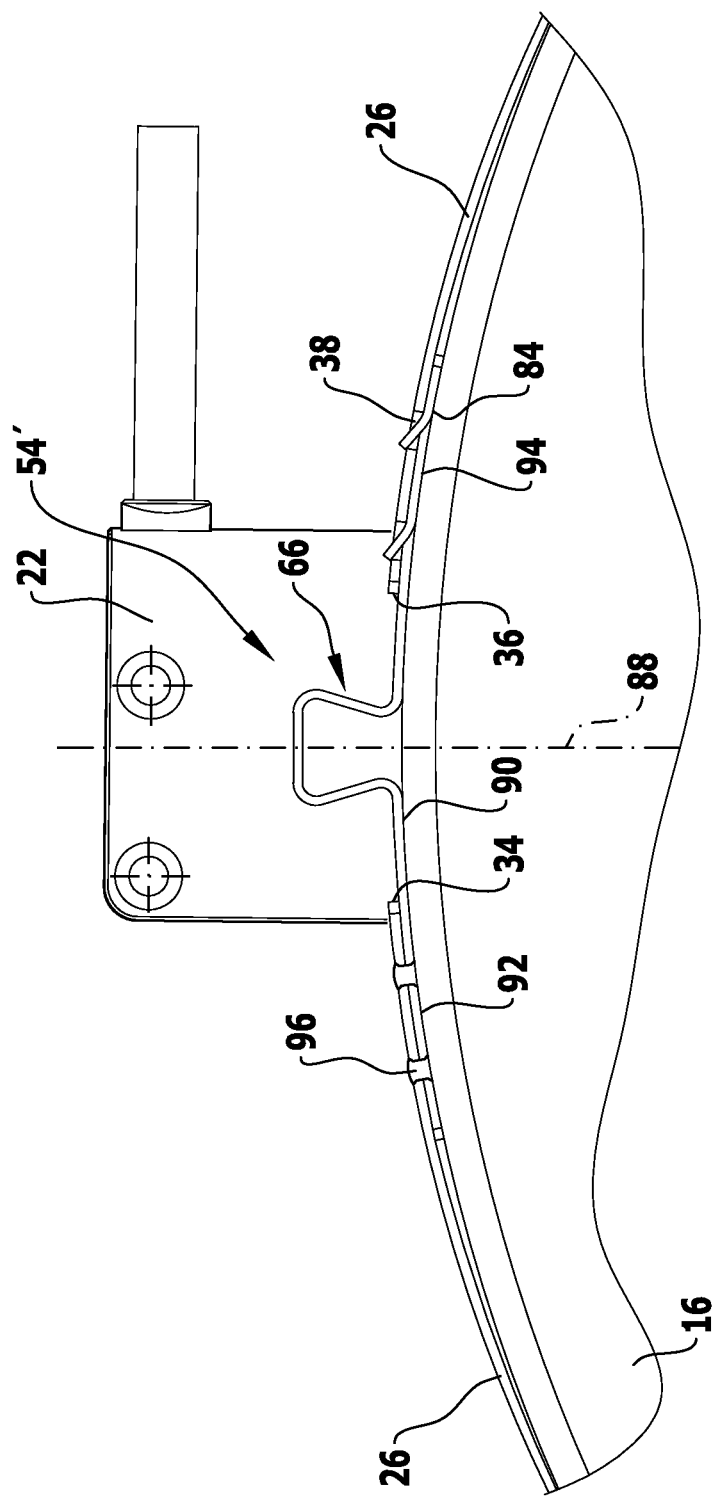
FIG. 3 shows the same view as in FIG. 2 in a second variant.

In one embodiment, which is shown FIG. 3, recesses 38 are arranged only in the region of the second end 36 of the fixing band 26.

In a further embodiment, recesses 38 are present over the entire length of the fixing band 26 from the first end 34 to the second end 36.

In one embodiment, a first row 44 of recesses 38 and a second row 46 of recesses 38 are arranged on the fixing band 26 at least in the region of the second end 36. The first row 44 and the second row 46 are oriented in parallel and spaced apart from one another. The recess 38 of the first row 44 and the second row 46 in a transverse direction 48 to a longitudinal direction 50 of the fixing band 26 are preferably aligned with one another.

The measuring body 28 is arranged between the first row 44 and the second row 46.

Basically, a fixing band may be configured in different ways. For example, the recesses 38, at least in the region of the second end 36 of the fixing band 26, are punched out of the fixing band itself. The fixing band 26 then has a uniform width over its entire length. It is, in particular, formed integrally.

It is also possible for the fixing band to have lugs in the region of the corresponding recesses, on which lugs the recesses 38 are formed, and these lugs are integrally formed on the remaining fixing band or fixed thereto.

Basically, it is also possible for, for example, a plurality of fixing bands spaced apart in the transverse direction 48 to be provided for fixing the measuring body 28.

The measuring body 28 is positioned on the upper side 40 or the lower side 42 of the fixing band 26.

The first end 34 and the second end 36 of the fixing band 26 are fixed relative to one another by means of a first connecting mechanism 52 and a second connecting mechanism 54 with a connecting direction 56, which is parallel to the longitudinal direction 50. The first connecting mechanism 52 is arranged here on recesses 38 of the first row 44 and the second connecting mechanism 54 is arranged on recesses 38 of the second row 46. The first connecting mechanism 52 and the second connecting mechanism 54 are spaced apart parallel to one another in the transverse direction 48. Formed between the first connecting mechanism 52 and the second connecting mechanism 54 is a "channel" 58, in which there can be positioned the sensor device 14 with, for example, the first sensor 22. Even when connecting the ends 34 and 36 of the fixing band 26, the movability of the measuring body device 12 relative to the sensor device 14 is not affected thereby either and the height spacing of the first sensor 22 or the second sensor 24 can be kept the same in each relative rotational position of the measuring body device 12 with respect to the first sensor 22 and the second sensor 24.

The first connecting mechanism 52 and the second connecting mechanism 54 in each case comprise a bridge element 60 with a first region 62 and a second region 64. The first region 62 is fixed relative to the first end 34 of the fixing band 26. The second region 64 is fixed relative to the second end 36 of the fixing band 26, when the measuring body device 12 is kept tensioned on the application 16.

The first region 62 and the second region 64 are, in each case, in the form of a band and, in particular, produced from a metallic material. If the measuring body device 12 is kept tensioned on the application 16, the first region 62 and the second region 64 preferably abut a surface region 61a, 61b of the application 16.

A path storage device 66 is arranged on the bridge element 60. Said path storage device comprises a first transverse element 68, which is integrally connected to the first region 62 of the bridge element 60. Furthermore, it comprises a second transverse element 70, which is integrally connected to the second region 64 of the bridge element 60. The first transverse element 68 and the second transverse element 70 are oriented here transverse to the corresponding first region 62 or second region 64.

In one embodiment, the first transverse element 68 and the second transverse element 70 are located at an angle 72 with respect to the corresponding first region 62 or second region 64, this angle preferably being within a range between 60° and 90°. In a particularly favourable embodiment, this angle 72 is an acute angle, which is less than 90°.

The acute angle 72 is, in this case, such that the corresponding transverse element, for example the first transverse element 68, starting from the connecting point with the corresponding first region 62, runs upwardly and also runs in the direction of the first region 62. Correspondingly, the second transverse element 70 runs upwardly from the second region 64 and also in the direction of the second region 64. A spacing between the first transverse element and the second transverse element 70 thus becomes smaller downwardly toward the regions 62, 64.

The first transverse element 68 and the second transverse element 70 are spaced apart from one another, a free space 74 being formed between them.

The first transverse element 68 and the second transverse element 70 are connected to one another by a web element 76. This web element 76 is integrally connected to the first transverse element 68 and integrally connected to the second transverse element 70. The web element 76 is itself oriented transverse to the first transverse element 68 and the second transverse element 70. It is, in particular, oriented at least approximately parallel to the first region 62 and the second region 64. It terminates the free space 74 at the top. Owing to the first transverse element 68, the second transverse element 70 and the web element 76, a type of turning outwards is formed at the bridge element 60.

The web element 76 may have one or more recesses 78 (FIG. 5), a recess 78 being formed, in particular, by a through opening.

By means of the path storage device 66, the spacing between the first region 62 and the second region 64 can be determinably adjusted by adjusting the spacing between the first transverse element 68 and the second transverse element 70. By plastic deformation of the path storage device 66, the corresponding spacing is determinably adjusted. The determination takes place here by plastic deformation of the path storage device 66 and, in particular, by plastic deformation at the web element 76 and/or the first transverse element 68 and/or the second transverse element 70. One or more recesses 78 on the web element 76 facilitate the deformability.

Respective external faces 80a, 80b of the first transverse element 68 and the second transverse element 70 (FIG. 6) form engagement faces for a tool 82, such as, for example, pliers. By exerting pressure, the spacing between the first transverse element 68 and the second transverse element 70 and thus the spacing between the first region 62 and the second region 64 can be determinably reduced. In turn, if the bridge element 60 is fixed relative to the fixing band 26, the latter can thus be fixed in a tensioned manner on the application 16.

If the first transverse element 68 and the second transverse element 70 are oriented at an acute angle of less than 90° with respect to the respective first region 62 or second region 64, it can also be ensured upon the action of a tool that the bridge element 60 is pressed on the surface regions 61a, 61b of the application 16.

In one embodiment, which is shown in FIG. 2, the bridge element 60, both on the first region 62 and on the second region 64, has hooks 84 in each case. For example, in each case, a plurality of hooks arranged one behind the other are in each case provided here on the first region 62 and on the second region 64. In this case, the hooks 84 point upwardly. They are, for example, formed by a punching on the bridge element 60. A spacing of adjacent hooks 84 in the first region 62 and the second region 64, in each case, corresponds to the spacing $D_2$ of recesses 38 of the fixing band 26.

The hooks 84, if the measuring body device 12 is fixed on the application 16, enter the corresponding recesses 38 of the fixing band 26.

In the embodiment according to FIG. 2, hooks 84 on the first region 62 enter recesses 38 in the region of the first end 34 of the fixing band 26. The hooks 84 in the second region 64 enter recesses 38 in the region of the second end 36 of the fixing band 26. The connecting mechanism 56 can thereby be fixed both in the region of the first end 34 of the fixing band 26 and in the region of the second end 36 of the fixing band 26 by hooking in.

The bridge element 60 abuts with the first region 62 and the second region 64 on the surface regions 61a, 61b of the application 16. The fixing band 26 abuts with the region at the first end 34 on the first region 62 of the bridge element 60 and with the region at the second end 36 on the second region 64, the hooks 84 being hooked in the corresponding recesses 38.

The recesses 38 in each case have an end face 86, which faces the path storage device 66. The hooks 84 in each case rest on the end face 86 of the recesses 38.

To fix the measuring body device 12, the corresponding connecting mechanisms 52, 54 are hooked in by means of the respective bridge element 60 on the recesses 38 in the region of the first end 34 of the fixing band and in the region of the second end of the fixing band 36. The connecting devices 52, 54 are accordingly dimensioned with respect to their length.

By exerting pressure on the first transverse element 68 and the second transverse element 70, in particular by means of a tool 82, the spacing thereof can be reduced. As a result, the first region 62 is pulled in the direction of a centre line 88 of the path storage device 66. Furthermore, the second region 64 is pulled in the direction of this centre line 88 and the fixing band 26 is also pulled, in this case, at the respective first end 34 and second end 36 and thus held tensioned.

In a further embodiment, which is shown in FIG. 3, connecting mechanisms 52', 54' are provided and are basically configured the same as the first connecting mechanism 52 and the second connecting mechanism 54 with the difference, that a hooking in is only provided in the region of the second end 36 of the fixing band 26.

For this purpose, a bridge element 90 is provided, which has a path storage device corresponding to the path storage device 66 (the same reference numerals are used for the same elements). This bridge element 90 in turn has a first region 92 and a second region 94. The second region 94 is basically configured the same as the second region 64, which was described above.

The bridge element 90 is fixedly connected by the first region 92 to the fixing band in the region of the first end 34. For example, the first region 92 is welded or fixedly connected by screw elements 96 (FIG. 3) to the fixing band 26. The corresponding connecting mechanisms 52', 54' are fixedly installed on the fixing band 26.

The second region 94 has hooks 84, which can enter recesses 38 in the region of the second end 36 of the fixing band 26.

For fixing, the fixing band 26 is placed on the second region 94 of the bridge element 90 in the region of the second end 36 and, in the process, the hooks 84 are hooked in the corresponding recesses 38 in the region of the second end 36 of the fixing band 26.

By exerting pressure on the path storage device 66, the spacing between the first region 92 and the second region 94 is reduced and, in the process, the spacing between the first end 34 and the second end 36 of the fixing band 26 is reduced and the latter is thereby held tensioned on the application 16.

In the embodiment according to FIG. 2, hooks 84 are provided both on the first region 62 and on the second region 64.

In the embodiment according to FIG. 3, hooks are only provided on the second region 94, i.e. for the region at the second end 36 of the fixing band 26.

It is basically possible here for a region 62, 64 or 94 to have one hook or more than two hooks.

It is basically possible for the first connecting mechanism 52 or 52' and the second connecting mechanism 54 or 54' to be configured the same.

It is also possible for one of the connecting mechanism to be configured as described above and the other connecting mechanism to be configured as described in the not prior published German utility model No. 20 2009 017 132.9 of the same Applicant, hook elements with hooks being provided, between which a screw is arranged and the spacing between the hook elements can be reduced by tightening the screw.

The measuring body 28 has a first end 98, which is associated with the first end 34 of the fixing band 26 (FIG. 5). It furthermore has a second end 100, which is associated with the second end 36 of the fixing band 26. In connection therewith, it is provided that the measuring body 28 ends at its first end 98 and its second end 100, in each case, with a complete coding field such as, for example, a complete magnetic pole field.

The coding continues completely over the first end 98 and the second end 100 of the measuring body 28. The measuring body 28 is not modified thereby and only minimally interfered with. As a result, the sensor device 14, without interruption of the coding, can travel over the region at the first end 98 and at the second end 100. Angles of rotation of greater than 360° can thus also be detected, for example. The measuring body 28 can be utilised over the entire range of 360°.

Under some circumstances, the linearity in the region between the first end 98 and the second end 100 is disrupted, this interference being minimal.

The measuring body device 12 is kept tensioned on the application 16 by means of the connecting device 52, 54 or 52', 54', the tension being producible by action on the path storage device 66.

For example, a circular measuring body can then be traveled over with corresponding fixing and configuration.

If a first sensor 22 and a second sensor 24 are used, the total angular range of 360° can be measured and the region, in which the end 98 and the end 100 of the measuring body 28 meet one another, can also be bridged.

In a specific embodiment, the fixing band 26 is produced from a sheet metal material, which, for example, has a thickness in the range between 0.2 mm and 0.4 mm. For example, the fixing band 26 has a width in the transverse direction 28 of about 25 mm.

A typical value for the spacing $D_1$ is 1 cm.

If the measuring body 28 is fixed on the lower side 42 of the fixing band 26, it is well protected against environmental influences. Basically, the possibility also exists, however, of positioning the measuring body 28 on the upper side 40.

Figure 7:
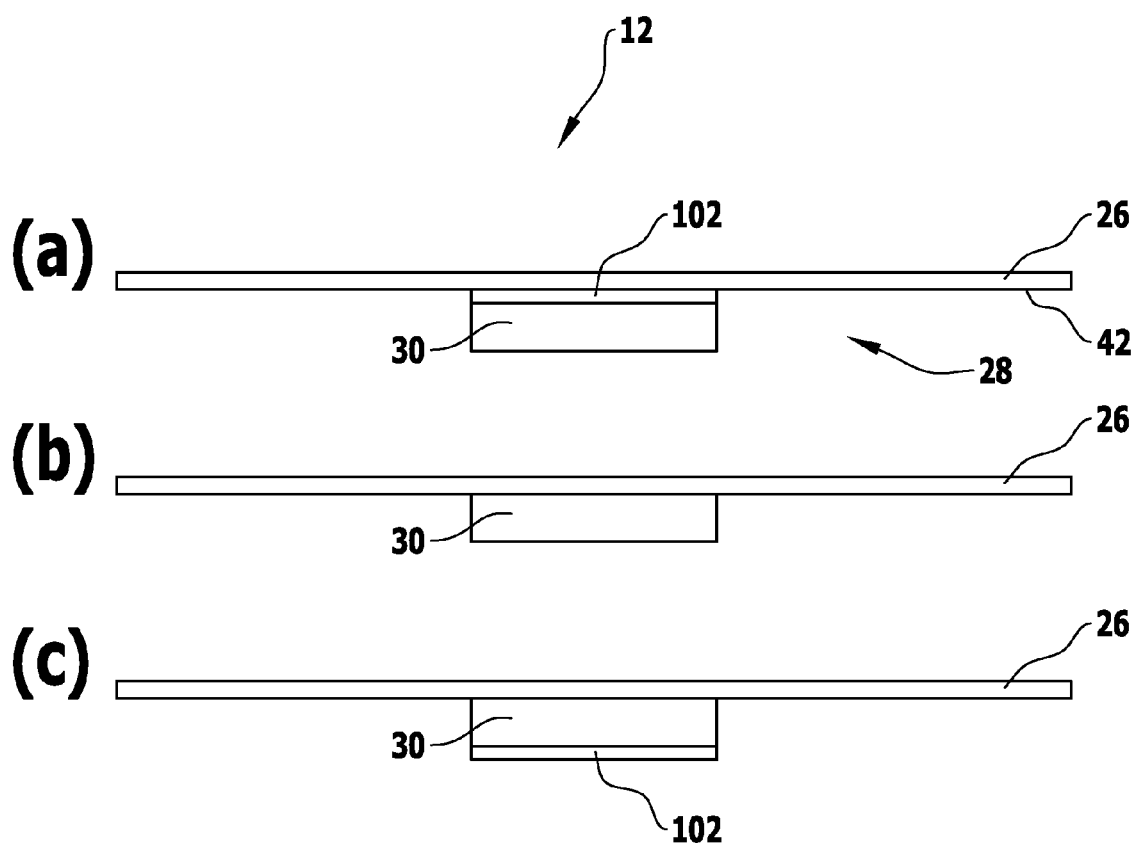
FIGS. 7 (a), (b), (c) show various embodiments of measuring bodies, which are fixed on a fixing band.

In one embodiment (FIG. 7(*a*)), the measuring body 28 comprises a coding layer 30 made of a band material. A covering band 102 is arranged on this coding layer. The covering band 102 faces the lower side 42 of the fixing band 26 and the measuring body 28 is connected, for example adhesively, by the covering band 102 to the fixing band 26.

A coded measuring body, in which a covering band also forms a carrier band for coding material, is described in the German utility model application, not prior published, No. 20 2009 003 253.1 of 27 Feb. 2009, and in the US patent application, not prior published, Ser. No. 12/470,796 of 22 May 2009.

It is also basically possible, as shown in FIG. 7(*b*), for the coding layer 30 to be arranged directly on the fixing band 26.

In a further embodiment, the coding layer 30 is arranged on the fixing band 26 and a covering band 102 is seated on the coding layer 30 remote from the fixing band 26 (FIG. 7(*c*)).

It may be provided, as shown schematically in FIG. 8, that spaced-apart tabs 104*a*, 104*b* are arranged on the fixing band. The tabs 104*a*, 104*b* are, in particular, integrally formed on the fixing band 26 and, for example, produced by stamping.

A spacing between the tabs 104*a*, 104*b* corresponds to the width of the measuring body 28. The measuring body 28 is positioned and, in particular fixed, between the tabs 104*a*, 104*b*. The tabs 104*a*, 104*b* in this case have a height, with which they project beyond the lower side 42 or upper side 40 of the fixing band 26, this height being smaller than the corresponding height of the measuring body 28.

It is basically possible, as schematically shown in FIG. 9, for the tabs 104*a*, 104*b* to be produced, for example, by stamping recesses on the fixing band 26, these recesses being independent of the recesses 38.

It is also possible, as shown schematically in FIG. 10, for recesses 38 and tabs 104*a*, 104*b* to be adjacent to one another.

When a recess 38 is produced, only a partial punching takes place and a corresponding tongue 106 is bent off, in order to form a tab 104a or 104b.

In one embodiment, the measuring body 28 is not directly fixed on the fixing band 26, but the measuring body 28 is fixed on an application, for example by adhesion. The fixing band 26 is then placed over the measuring body 28 and, as described above, a tensioning takes place by means of the connecting devices 52, 54. As a result, a (releasable) fixing of the measuring body 28 also takes place on the fixing band 26, the fixing band 26 (after release of the fixing) being removable from the measuring body 28. The measuring body is to a certain extent fixed loosely relative to the fixing band 26. The fixing band 26 then forms a protective band for the measuring body 28.

Figure 11:
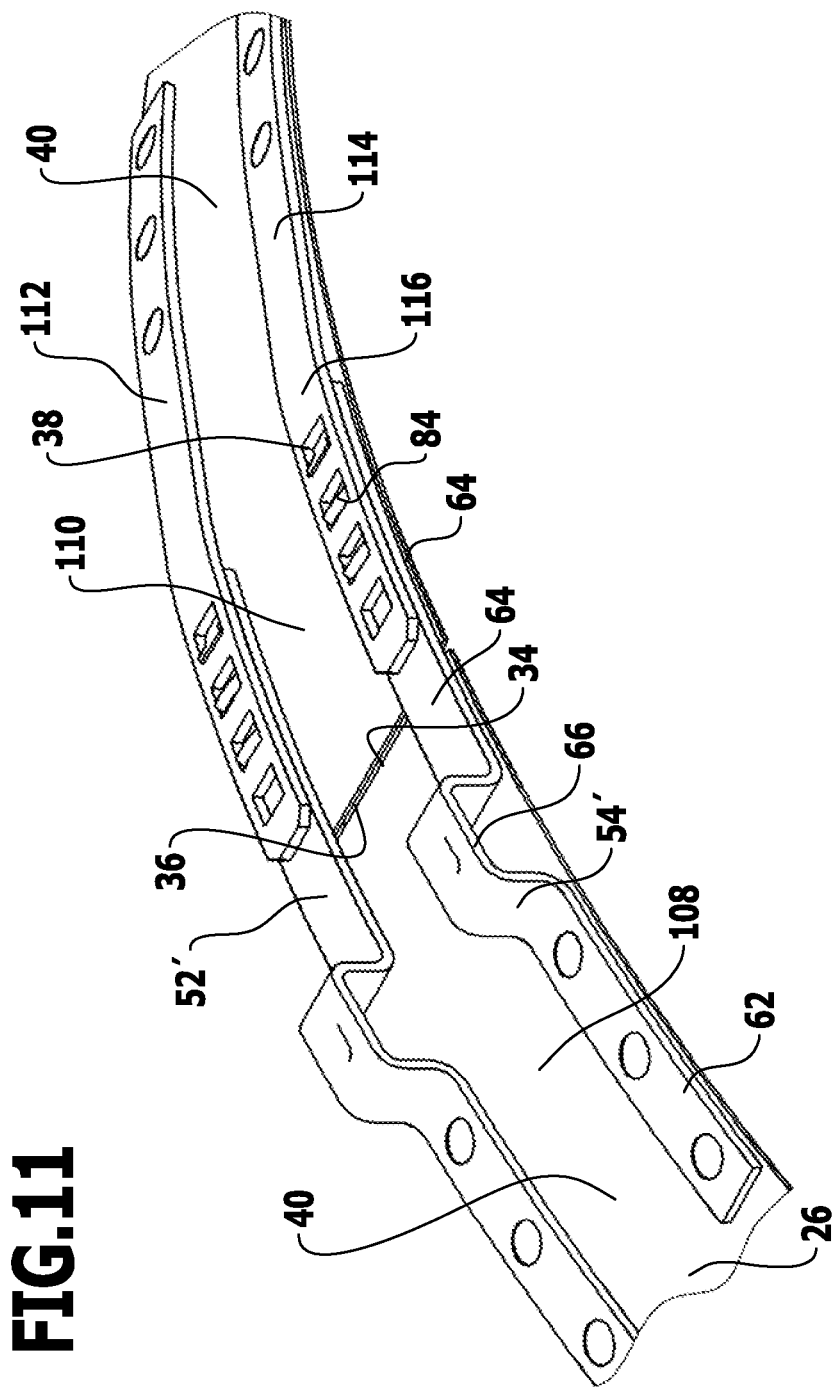
FIG. 11 shows a similar view to FIG. 5 in a variant of an embodiment without a sensor head.

In one embodiment, which is shown without a sensor head in a perspective part view in FIG. 11, a fixing band 26 with a first end 34 and a second end 36 is provided. When the associated measuring body is fixed on the application 16, these ends 34, 36 oppose one another with a slight spacing or meet one another.

Connecting mechanisms 52', 54' are fixed in a region 108 of the fixing band 26, on which the first end 34 is formed. The connecting mechanisms 52', 54' are connected by the corresponding first region 62 to the region 108 of the fixing band 26, for example by screwing or welding. The corresponding first region 62 in this case preferably abuts the upper side 40.

The corresponding path storage device 66 of the connecting mechanisms 52', 54' is located spaced apart from the first end 34 of the fixing band 26. The path storage device 66 is thus located in the region 108 of the fixing band 26.

The second regions 64 of the connecting mechanisms 52', 54' extend beyond the first region 34 into a region 110 of the fixing band 26, on which the second end 36 is formed.

Hooks 84 are arranged on the second region 64, as described above.

Web elements 112, 114 are fixed on the region 110 of the fixing band 26. A first web element 112 is associated with the connecting mechanism 52' here and a second web element 114 is associated with the second connecting mechanism 54'.

The web elements 112, 114 are fixed, for example by screwing or welding, to the fixing mechanism in the region 110. They abut the upper side 40 of the region 110 in a fixing region.

The respective web elements 112, 114 have a front region 116. Recesses corresponding to the recesses 38 are formed in this front region 116. The hooks 84 can hook into these recesses 38.

The front region 116, when the measuring body is fixed, is spaced apart from the upper side 40 of the fixing band 26 in the region 110. A part of the second region 64 of the associated connecting mechanism 52' or 54' is located between the front region 116 of the web elements 112, 114 and the upper side 40. This part of the second region 64 thus abuts the upper side 40 in the region 110 of the fixing band 26. The corresponding front region 116 of the web element 112 or 114 abuts the associated second region 64.

Otherwise, the corresponding measuring body device functions as described above.

Figure 12:
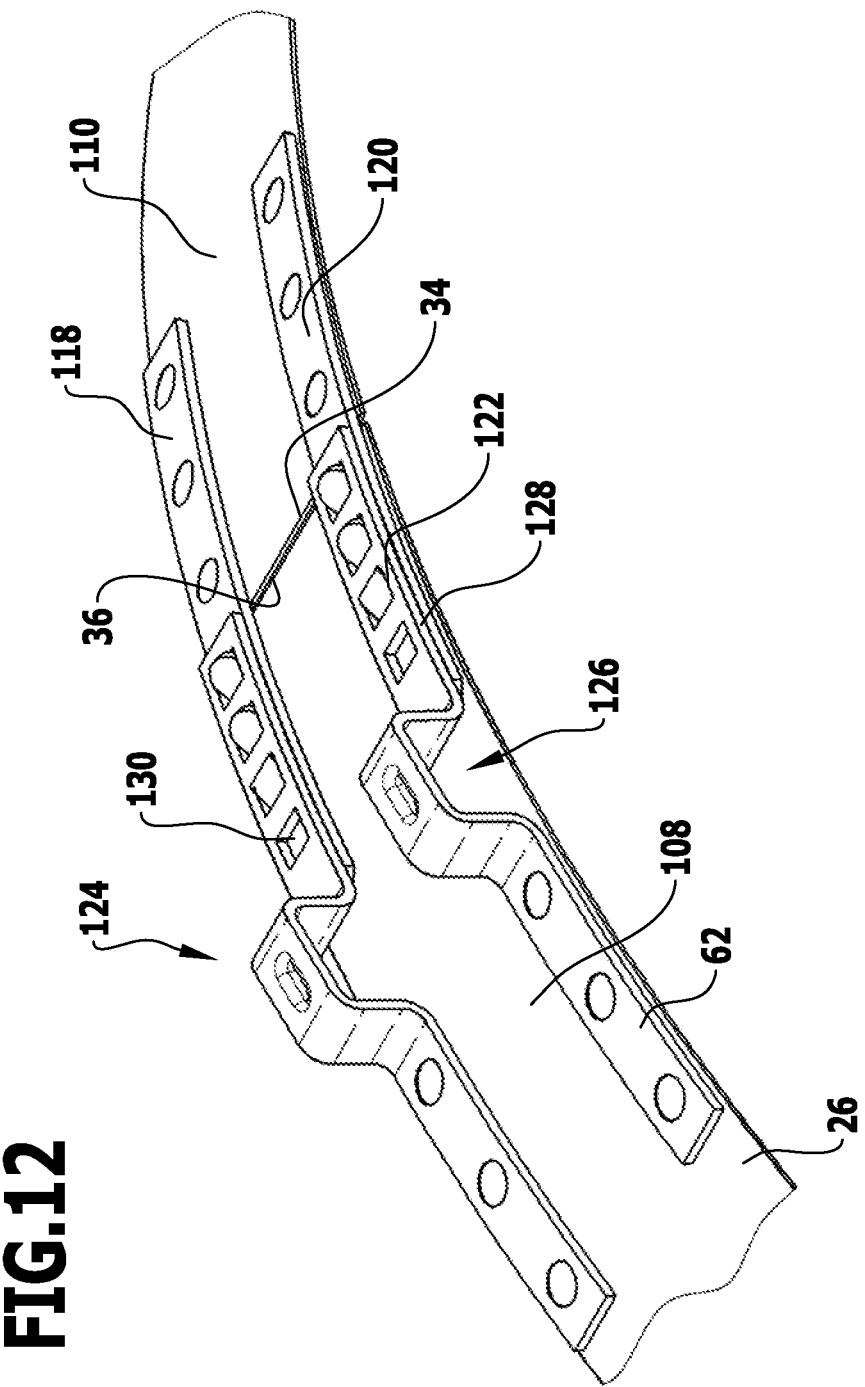
FIG. 12 shows a similar view to in FIG. 11 in a further variant of an embodiment.

In a further embodiment, which is shown schematically in FIG. 12, a fixing band 26 is again provided with a region 108, on which the first end 34 is formed. Furthermore, a region 110 is provided, on which the second end 36 is formed.

Web elements 118, 120 are fixed on the region 110. For example, these are screwed or welded to the fixing band 26 in the region 110.

The first web element 118 and the second web element 120 are spaced apart with a channel for a sensor head located in between. They project beyond the second end 36 of the fixing band in the direction of the region 108.

Hooks 122 are formed on the web elements 108, 120. These hooks are, in particular, integrally formed. A region of the web elements 118, 120, which projects beyond the second end 36, is provided with the hooks 122.

When the corresponding measuring body device is fixed, the web elements 118, 120 with the region, on which the hooks 122 are formed, abut the region 108 of the fixing band 26.

A first connecting mechanism 124 and a second connecting mechanism 126 are fixed on the region 108. The connecting mechanisms are, in this case, basically the same in configuration in their first region 62 and in the path storage device 66 as described above and the same reference numerals are used.

Recesses 130 are formed in a second region 128 of the connecting mechanisms 124 and 126. The corresponding second region 128 in this case lies above the region 108 of the fixing band 26. The recesses 130 are used to hook in the hooks 122 of the respective web elements 118, 120. When the corresponding measuring body device is fixed, the web elements 118, 120 abut with their respective hook region on the upper side 40 of the region 108 of the fixing band 26. The respective second regions 128 of the first connecting mechanism 124 and the second connecting mechanism 126 abut these hook regions, the hooks 122 being engaged with the associated recesses 130.

Otherwise, the corresponding measuring body device functions as described above.

LIST OF REFERENCE NUMERALS 10 position/path measurement system
12 measuring body device
14 sensor mechanism
16 application
18 shaft
20 rotational axis
22 first sensor
24 second sensor
26 fixing band
28 measuring body
30 coding layer
32a magnetic pole fields
32b magnetic pole fields
34 first end
36 second end
38 recess
40 upper side
42 lower side
44 first row
46 second row
48 transverse direction
50 longitudinal direction
52 first connecting mechanism
52' first connecting mechanism
54, second connecting mechanism
54' second connecting mechanism
56 connecting direction
58 channel
60 bridge element
61a surface region
61b surface region
62 first region
64 second region 66 path storage device
68 first transverse element
70 second transverse element
72 angle
74 free space
76 web element
78 recess
80a external face
80b external face
82 tool
84 hook
86 end face
88 centre line
90 bridge element
92 first region
94 second region
96 screw element
98 first end of the measuring body
100 second end of the measuring body
102 covering band
104a tab
104b tab
106 tongue
108 region
110 region
112 first web element
114 second web element
116 front region
118 first web element
120 second web element
122 hook
124 first connecting mechanism
126 second connecting mechanism
128 second region
130 recess

The invention claimed is:

1. Measuring body device for a position/path measurement system, comprising:
at least one fixing band to fix the measuring body device to an application;
the at least one fixing band having a first end and a second end;
a measuring body in the form of a band with at least one coding layer made of coding material, which is associated with the least one fixing band; and
at least one connecting mechanism, which fixes the first end and the second end of the fixing band relative to one another;
the at least one connecting mechanism comprising a bridge element, which is fixed or is fixable relative to the first end and relative to the second end of the at least one fixing band; and
at least one path storage device arranged on the bridge element with a first transverse element, a second transverse element, which is spaced apart from the first transverse element, and a web element;
wherein:
the first and second transverse elements are transverse to the web element,
the web element connects the first transverse element and the second transverse element,
the web element is integrally connected to the first transverse element and the second transverse element, and
a spacing between the first transverse element and the second transverse element is determinably adjustable by plastic deformation of at least one of the web element, the first transverse element, and the second transverse element.

2. Measuring body device according to claim 1, wherein the bridge element comprises a first region, which is fixed or fixable relative to the first end of the at least one fixing band and on which the first transverse element is integrally seated.

3. Measuring body device according to claim 2, wherein the first transverse element is oriented transverse to the first region.

4. Measuring body device according to claim 1, wherein the bridge element comprises a second region, which is fixed or fixable relative to the second end of the at least one fixing band and on which the second transverse element is integrally seated.

5. Measuring body device according to claim 4, wherein the second transverse element is oriented transverse to the second region.

6. Measuring body device according to claim 1, wherein the web element has at least one recess.

7. Measuring body device according to claim 1, wherein the first transverse element and the second transverse element have engagement faces for a tool to shorten the spacing between the first transverse element and the second transverse element.

8. Measuring body device according to claim 1, wherein one or more recesses or one or more hooks are arranged on the at least one fixing band in a region of at least one of the first end and the second end.

9. Measuring body device according to claim 8, wherein there are arranged on the bridge element at least one of one or more hooks to engage in one or more recesses, which are positioned on the at least one fixing band, and one or more recesses for the engagement of the one or more hooks, which are positioned on the at least one fixing band.

10. Measuring body device according to claim 9, wherein the one or more hooks or the one or more recesses are arranged on the bridge element toward one end of the at least one fixing band.

11. Measuring body device according to claim 10, wherein the bridge element is fixedly connected to the at least one fixing band relative to one end and the one or more hooks are provided for fixing relative to the other end.

12. Measuring body device according to claim 9, wherein the at least one of the one or more hooks and the one or more recesses are provided on the bridge element toward the two ends of the at least one fixing band.

13. Measuring body device according to claim 9, wherein the one or more hooks each comprise a stamped tab element.

14. Measuring body device according to claim 9, wherein, in a region of a hook connection of the one or more hooks, an element with the one or more recesses abuts an element with the one or more hooks and one of the one or more hooks engages from below in an associated recess.

15. Measuring body device according to claim 9, wherein when at least one fixing band is fixed on the application, one of the one or more hooks abuts an end face of the associated recess, which faces the path storage device.

16. Measuring body device according to claim 8, wherein at least one of the one or more recesses and the one or more hooks, which are arranged on the at least one fixing band, is positioned on a further web element, which is connected to the at least one fixing band.

17. Measuring body device according to claim 8, wherein the one or more recesses on the at least one fixing band comprises one or more through holes.

18. Measuring body device according to claim 8, wherein the one or more recesses comprises a plurality of recesses which are uniformly spaced apart.

19. Measuring body device according to claim 8, wherein a spacing of adjacent recesses of the one or more recesses in a longitudinal direction of the at least one fixing band is the same as a coding period or an integral multiple thereof.

20. Measuring body device according to claim 8, wherein the one or more recesses comprise a first row of the recesses and a second row of recesses, the measuring body being positioned between the first row and the second row of recesses.

21. Measuring body device according to claim 1, wherein tabs for at least one of positioning and fixing the measuring body are integrally formed on the at least one fixing band.

22. Measuring body device according to claim 21, wherein the tabs comprise stamped tabs.

23. Measuring body device according to claim 21, wherein the tabs are arranged on recesses and are at least partly made of material which is removed at the recesses.

24. Measuring body device according to claim 1, wherein the at least one fixing band is a metal band.

25. Measuring body device according to claim 1, wherein the at least one fixing band is flexible.

26. Measuring body device according to claim 1, wherein:
the measuring body has a first end and a second end,
when the first end and the second end of the at least one fixing band are relatively fixed, the measuring body continues over the first end and the second end without coding modification.

27. Measuring body device according to claim 1, wherein at least two hooks are arranged on at least one of the bridge element and the at least one fixing band.

28. Measuring body device according to claim 27, wherein the at least two hooks are arranged one behind the other in relation to a connecting direction of the first end and the second end of the at least one fixing band.

29. Measuring body device according to claim 1, wherein the connecting mechanism comprises a first connecting mechanism, which is associated with a first row of recesses, and a second connecting mechanism, which is associated with a second row of recesses.

30. Measuring body device according to claim 1, wherein the bridge element abuts an upper side of the at least one fixing band and is connected thereto.

31. Measuring body device according to claim 1, wherein the measuring body has a covering band, which covers the at least one coding layer.

32. Measuring body device according to claim 31, wherein the covering band faces the at least one fixing band.

33. Measuring body device according to claim 31, wherein the covering band faces away from the at least one fixing band.

34. Measuring body device according to claim 1, wherein the measuring body is magnetically coded and comprises a magnetic material as a coding material.

35. Measuring body device according to claim 1, wherein the measuring body is optically or capacitively coded.

36. Measuring body device according to claim 1, wherein a closed configuration of the at least one fixing band is provided, when the first end and the second end of the fixing band are fixed relative to one another.

37. Measuring body device according to claim 1, wherein the measuring body is fixed on the at least one fixing band.

38. Position/path measurement system, comprising:
(i) a measuring body device comprising:
at least one fixing band to fix the measuring body device to an application;
the at least one fixing band having a first end and a second end;
a measuring body in the form of a band with at least one coding layer made of coding material, which is associated with the least one fixing band; and
at least one connecting mechanism, which fixes the first end and the second end of the fixing band relative to one another;
the at least one connecting mechanism comprising a bridge element, which is fixed or is fixable relative to the first end and relative to the second end of the at least one fixing band; and
at least one path storage device arranged on the bridge element with a first transverse element, a second transverse element, which is spaced apart from the first transverse element, and a web element;
wherein:
the first and second transverse elements are transverse to the web element,
the web element connects the first transverse element and the second transverse element,
the web element is integrally connected to the first transverse element and the second transverse element, and
a spacing between the first transverse element and the second transverse element is determinably adjustable by plastic deformation of at least one of the web element, the first transverse element, and the second transverse element; and
(ii) a sensor device, which has at least one sensor sensitive to the coding material.

39. Position/path measurement system according to claim 38, wherein the at least one sensor comprises a first sensor and a second sensor.

40. Position/path measurement system according to claim 39, wherein the first sensor and the second sensor are located opposite to each other.

41. Position/path measurement system according to claim 38, wherein the at least one sensor is magnetic field-sensitive and the measuring body is magnetically coded.

42. Application, on which a position/path measurement system is installed, said position/path measurement system comprising:
(i) a measuring body device comprising:
at least one fixing band to fix the measuring body device to an application;
the at least one fixing band having a first end and a second end;
a measuring body in the form of a band with at least one coding layer made of coding material, which is associated with the least one fixing band; and
at least one connecting mechanism, which fixes the first end and the second end of the fixing band relative to one another;
the at least one connecting mechanism comprising a bridge element, which is fixed or is fixable relative to the first end and relative to the second end of the at least one fixing band; and
at least one path storage device arranged on the bridge element with a first transverse element, a second transverse element, which is spaced apart from the first transverse element, and a web element;

wherein:
the first and second transverse elements are transverse to the web element,
the web element connects the first transverse element and the second transverse element,
the web element is integrally connected to the first transverse element and the second transverse element, and
a spacing between the first transverse element and the second transverse element is determinably adjustable by plastic deformation of at least one of the web element, the first transverse element, and the second transverse element; and
(ii) a sensor device, which has at least one sensor sensitive to the coding material;
said application comprising a rotatable or pivotable element, to which the at least one fixing band is fixed.

43. Application according to claim 42, wherein the fixing band surrounds the rotatable or pivotable element.

44. Application according to claim 42, wherein the at least one fixing band is held tensioned by means of the at least one connecting mechanism on the rotatable or pivotable element.

\* \* \* \* \*